Jan. 8, 1935.  F. C. BURNETT  1,986,877
TIRE COVER
Filed March 15, 1928   2 Sheets-Sheet 1
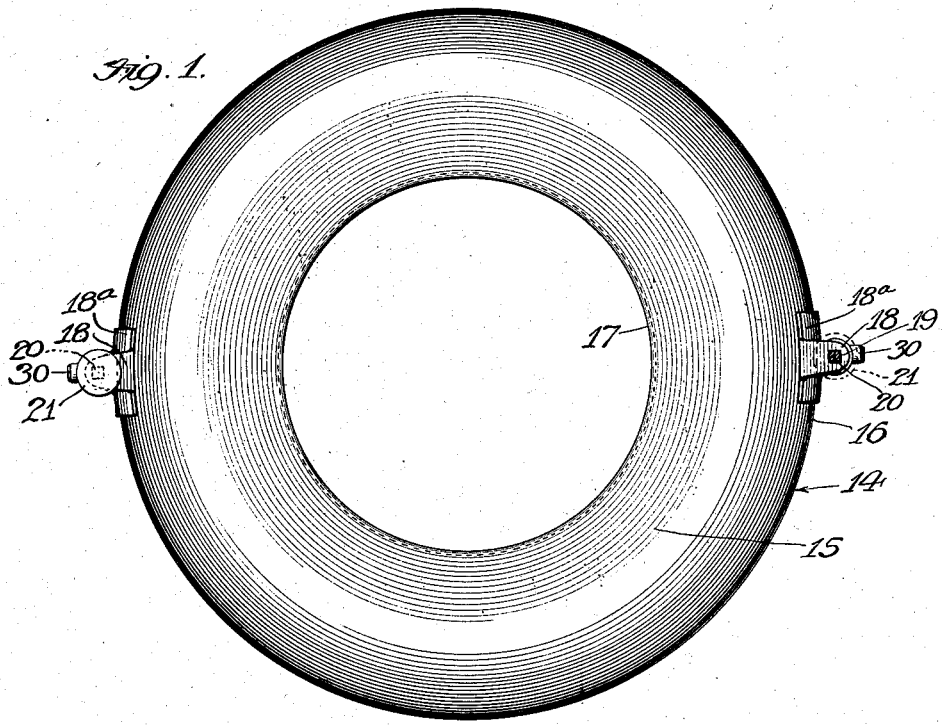
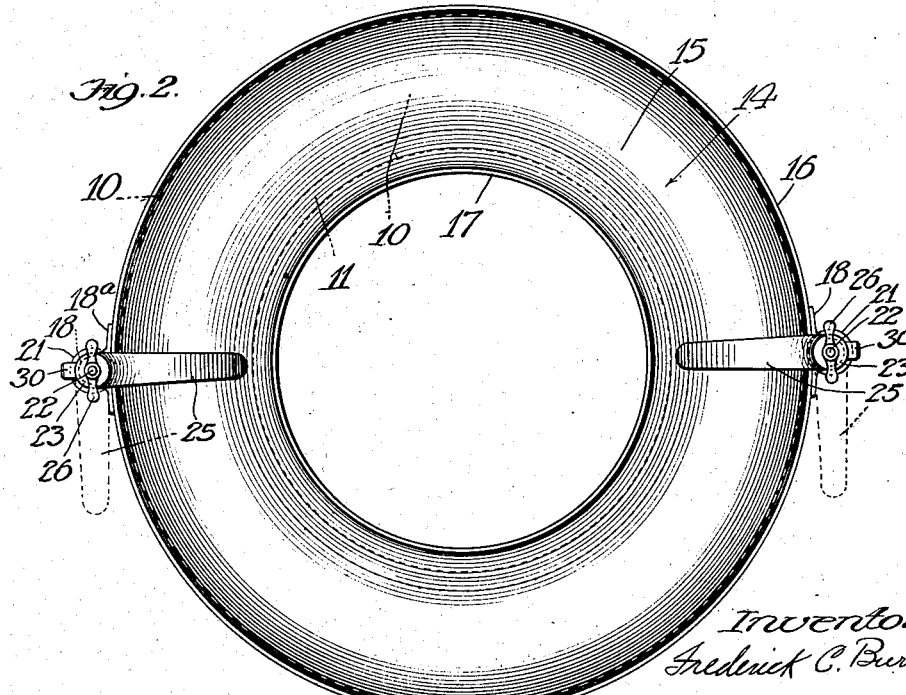

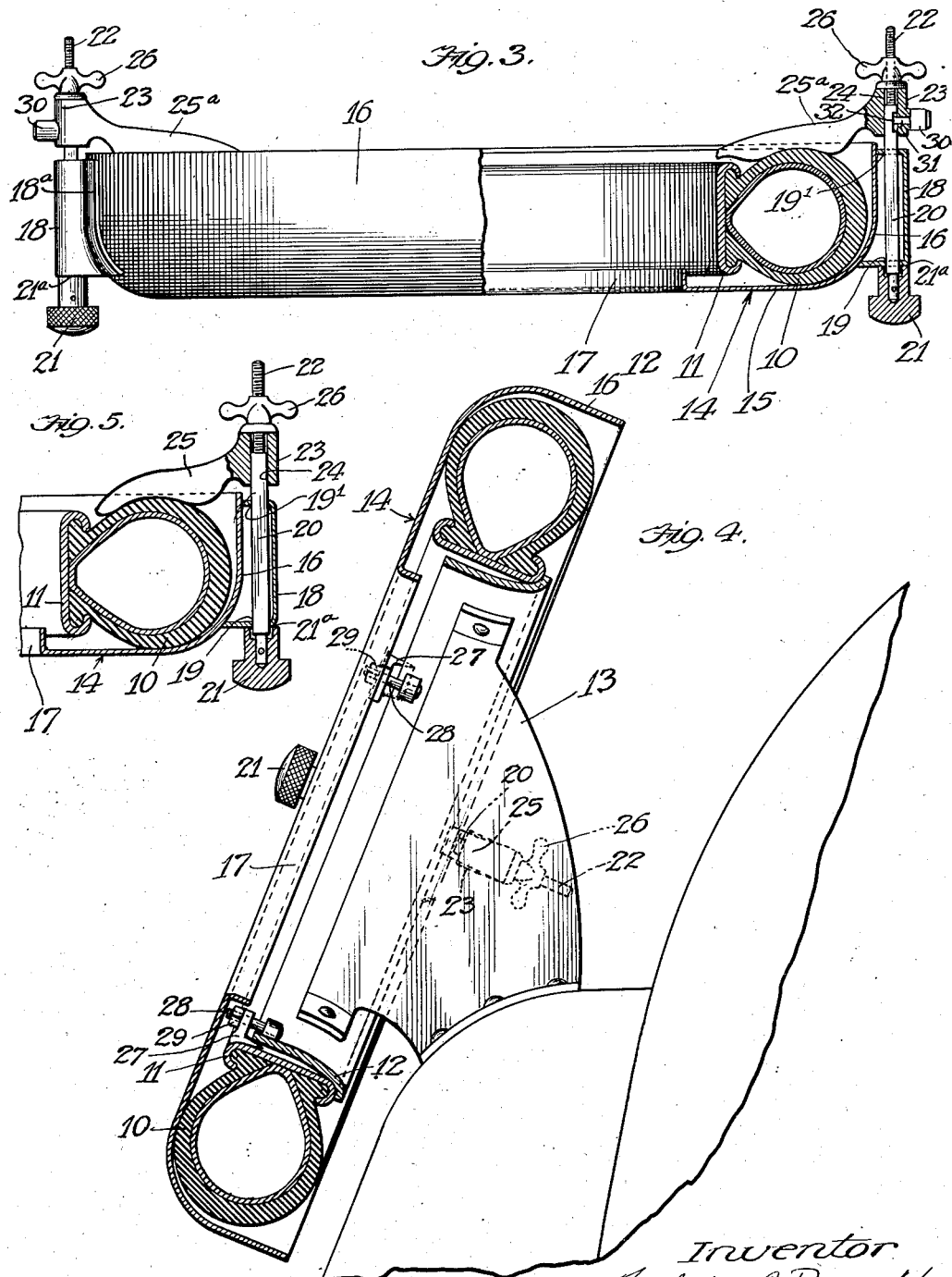

Patented Jan. 8, 1935

1,986,877

UNITED STATES PATENT OFFICE 1,986,877

TIRE COVER

Frederick C. Burnett, Chicago, Ill., assignor, by mesne assignments, to Lyon Incorporated, Detroit, Mich., a corporation of Delaware Application March 15, 1928, Serial No. 261,796

15 Claims. (Cl. 150—54)

My invention relates to a tire cover and has to do more particularly with a cover for spare tires usually carried at the rear or at the sides of automobiles.

One of the objects of my invention is to provide a cheap and light weight metal cover which may be easily handled and which is strong, durable and practically indestructible.

Another object is to provide a tire cover which efficiently shelters the whole tire surface from the weather and prevents injury to the same in case of impact due to collision and the like.

A further object is to provide a spare tire cover which is thief-proof and which, in its tire-covering position, serves to lock the spare tire upon the tire carrier structure preventing theft of not only the tire cover, but also the tire.

Additional objects are to provide a tire cover which may be given a permanent shape and finish and which may be very readily and quickly cleaned and polished; to provide a tire cover which will not wrinkle and crack and which will always present a nice appearance; and to provide a tire cover which may be readily and quickly installed upon the tire with a minimum of effort on the part of the workman.

Other objects and advantages will become apparent as this description progresses and by reference to the drawings wherein,—

Figure 1 is a front elevation (partially in section) of a spare tire cover embodying my invention;

Fig. 2 is an elevated view of the opposite side of the structure of Fig. 1;

Fig. 3 is an enlarged top plan view, partially in plan section, of a tire having my invention applied thereto;

Fig. 4 is a vertical section through a tire carrier structure supporting a tire and cover such as shown in Figs. 1 to 3, and showing the manner of locking the tire upon the carrier;

Fig. 5 is a fragmental plan sectional view, similar to Fig. 3, showing a slightly different form of my invention.

I have shown my invention applied to a spare tire 10 carried by a rim 11 which may be of any suitable form mounted upon the rim 12 of a tire-carrier which is supported by the rear part of the automobile by brackets 13 which, also, may take any desired form.

My improved tire cover is of a rigid type formed, preferably, of a light weight sheet metal shaped to shelter the outwardly exposed surfaces of the tire. More specifically, I provide a cover 14 which takes a cylindrical shape similar to the shape of the tire and which has an annular plane portion or face 15 adapted to cover the face of the tire, and an inwardly curved portion 16 which extends over the tread portion of the tire toward the car body. The face-portion 15 is of such width as to cover the entire face part of the tire as well as the adjacent exposed parts of the tire rim 11 and tire carrier rim 12. The inner edge of the portion 15 is turned over at right angles to form a rearwardly extending finishing flange 17. The curved tread-covering part 16 of the cover conforms to the curvature of the adjacent surface of the tire and such portion is extended inwardly to a point beyond the plane of the inward face of the tire so as to shelter that surface also from the weather as shown in Figs. 3 and 4.

In my preferred form, the tire cover is adapted to be secured and locked upon the tire in its mounted position by readily and quickly operable devices which are capable of manipulation only by authorized persons so as to prevent theft of the tire and tire cover. To this end, I provide at the opposite sides of the cover diametrically opposed hollow brackets 18 of a length to extend substantially across the cover portion 16. These brackets which are formed from sheet metal, have horizontally projecting side flanges 18ª which conform to the curvature of the outer surface of the tire cover and which are secured thereto by spot-welding or any other desired manner. The integral end walls of these brackets 18 are provided with rectangular-shaped openings 19, 19' which receive the clamp studs 20 which are, likewise, rectangular in cross section, so that they will not rotate relative to the brackets. These bolts are provided with heads 21, the shoulder portions 21ª of which engage the adjacent outer end of the bracket 18. These heads may be formed integrally with the studs 20 or may be separate, but permanently attached, members as shown in the drawings.

The studs 20 are long enough to extend beyond the rear rectangular opening 19' in the rear wall of the bracket. The rectangular section of such studs is continued beyond such bracket and the rear ends 22 of the studs are circular and threaded. The projecting part of each of the studs 20 is adapted to receive a clamp member having a shank 23 with a rectangular opening 24 therethrough which is adapted to snugly, but slidingly, fit over the rectangular projecting part of the stud. The shank 23 carries an integral jaw 25 which extends, in tire-covering position, radially toward the center of the tire to such an extent as to project behind the edge of the tire rim 11. The central part of this jaw is shaped to conform to the shape of the adjacent tire surface so as to snugly embrace the same. With this arrangement, when the shank 23 is moved along the stud 20 and toward the tire and upon the rectangular portion of the stud, the clamp jaw 25 is rendered non-rotatable and grips the tire and its supports. The thumb screw 26, which engages the threaded end portion 22 is tightened against the clamp shank 23 to rigidly clamp the cover upon the tire structure in its tire-covering position (Fig. 2). When it is desired to remove the cover, the thumb screws are loosened or removed and the clamp devices are slid away from the tire cover and the rectangular stud portion to a position upon the threaded end of the studs. They are then rotated to the dotted line position of Fig. 2, permitting the cover to be easily slipped from the tire.

As is well known, various forms of clamping devices are employed for securing the tire (and its supporting rim) upon the tire carrier. This is accomplished in the form shown in the drawings by means of wedge clamps 27, the wedging surface of which pass between the tire rim 11 and the tire carrier rim 12. This particular wedge clamp 27 is removably carried by the threaded stud 28 supported from the tire carrier rim and fastened in place by the nut 29. It is customary to employ various forms of tire-locking devices, practically all of which are associated with the means for clamping the tire to the tire carrier for preventing unauthorized removal of the tire from the tire carrier. In the use of my invention such prior tire-locking devices may be dispensed with. More particularly, I extend the face 15 of the tire cover radially inward to such an extent that the overlapping flange 17 extends over the tire clamp devices 27, 28 and 29 and renders the same inaccessible for manipulation except upon removal of the tire cover. The clamp shank 23 is provided with a lock 30 which may be of any desired, but preferably key-operated, form having a vertically reciprocable locking bolt 31 which, in locked position, is thrown inward into a recess 32 in the adjacent portion of the clamp studs 20 (Fig. 3). With this construction, it will be appreciated that when the jaw clamp device is adjusted in place upon the stud 20 and the lock 30 moved to its locked position, removal of the tire from the tire carrier as well as removal of the tire cover is prevented. This condition will exist until the lock 30 is moved to its unlocking position and the lock bolt 31 withdrawn permitting the clamp jaw to be moved away from the tire so that the cover can be removed as above explained.

There may be some instances where it is desirable to dispense with the lock 30. In that case, it may also be desirable to dispense with a clamping jaw of such length as to embrace the tire carrier rim, in which event a shorter clamp jaw 25ª, such as illustrated in Fig. 5 may be used which is shaped to snugly embrace the side of the tire.

The operation of the foregoing structure is believed obvious and may be briefly summarized as follows: To place the cover upon the tire, the clamp jaws are moved away from upon the rectangular portion of the studs 20 and rotated to a position indicated by the dotted lines in Fig. 2. The cover is then slipped upon the tire to the position shown in Fig. 4 and the clamp jaws dropped to the full line position of Fig. 2 and slid toward the tire and upon the rectangular portion of the clamp studs. The thumb screws are then tightened and the lock bolt shot into the stud recesses 32 by the use of the proper key (not shown). To remove the cover the reverse of the foregoing is carried out.

While I have shown only two forms of my invention, it will be understood that various other changes in deails and arrangement of parts may be made therein without departing from the spirit and scope of my invention as defined by the claims which follow. Furthermore, while I have shown my invention as applied to one form of tire and tire carrier structure, it may be applied to any other form. It may also be equally well applied to a tire mounted upon the disk of a disc wheel structure, or any other form of tire mounting.

I claim:

1. A tire cover comprising a cover member having the cylindrical shape of the tire and of such size and shape as to shelter the entire tire surface, brackets carried by said cover-member, studs non-rotatably carried by said brackets, clamp members rotatable upon a portion of said studs and non-rotatable upon another portion of said studs and slidable along said studs toward and from said rotatable positions, and means for positioning said clamp members in their non-rotatable positions.

2. A tire cover comprising a cover member having the cylindrical shape of the tire and of such size and shape as to shelter the entire tire surface, brackets carried by said cover-member, studs non-rotatably carried by said brackets and having recesses therein, clamp members rotatable upon a portion of said studs and non-rotatable upon another portion of said studs and slidable along said studs toward and from said rotatable positions, means for positioning said clamp members in their non-rotatable positions, and a lock associated with each of said clamp members and including a member engageable with the respective stud recess for locking said clamp members in their non-rotatable tire-covering position.

3. A tire cover having a body with a face portion adapted to fit over the face of the tire and a rearwardly curved portion adapted to fit over the tire tread surface and of such length as to extend beyond the plane of the other face of the tire and shelter the same, brackets carried by said body, clamp studs non-rotatably carried by said brackets and clamp devices associated with said studs, said clamp devices being adapted to rotatably engage said studs in one position thereon and to non-rotatably engage them in another position thereon and arranged for sliding movement on said studs from one said position to the other.

4. A tire cover having a body with a face portion adapted to fit over the face of the tire and a rearwardly curved portion adapted to fit over the tire tread surface and of such length as to extend beyond the plane of the other face of the tire and shelter the same, brackets, each having a recess therein, carried by said body, studs associated with said bracket, and clamp devices associated with said studs, said clamp devices being adapted to rotatably engage said studs in one position thereon and to non-rotatably engage them in another position thereon and arranged for sliding movement on said studs from one said position to the other, and a lock including a lock bolt adapted to engage each said stud recess for locking said clamp devices in their said non-rotatable position.

5. A tire cover having a body with a face portion adapted to fit over the face of the tire and a rearwardly curved portion adapted to fit over the tire tread surface and of such length as to extend beyond the plane of the other face of the tire and shelter the same, brackets carried by said body and having end walls with rectangular openings therein, studs rectangularly-shaped in cross-section passing through said bracket openings and having said rectangular portion extending beyond one of said end walls and terminating in a circular threaded portion, a clamp device having a rectangularly shaped opening therein and a clamping jaw slidable upon the rectangular projecting portion of said stud, and means including a member engaging said threaded portion for securing said device in position upon said rectangular stud portion.

6. A tire cover having a body with a face portion adapted to fit over the face of the tire and a rearwardly curved portion adapted to fit over the tire tread surface, brackets carried by said body and having end walls with rectangular openings therein, studs rectangularly-shaped in cross-section passing through said bracket openings and having said rectangular portion extending beyond one of said end walls, each said stud also having a recess in its projecting rectangular portion, a clamp device having a rectangularly shaped opening therein and a clamping jaw slidable upon the rectangular projecting portion of said stud, means for positioning said clamp device upon said rectangular stud portion, and a lock including a key-operated member adapted to engage said stud recess for locking said device in position upon said rectangular stud portion.

7. The combination with a tire carrier, a spare tire structure and clamp means associated with said carrier and spare tire structure for fastening the same together, of a cover for said tire having a body adapted to fit upon an exposed part of said tire, said body having a tire-face covering portion of such width as to extend over and render said tire carrier clamp means inaccessible, brackets carried by said body, clamp devices carried by said brackets including jaws adapted to extend over said tire surface and grip said tire structure, and locks associated with said jaws for locking said body in its tire-covering position and to prevent removal of the tire structure from the tire carrier except by an authorized person.

8. The combination with a tire carrier, a spare tire structure, and devices associated with said tire carrier for clamping said spare tire structure thereto, of a cover for said spare tire comprising a body having a part covering the face of the tire and of such width as to extend over and render said tire carrier clamping devices inaccessible, brackets carried by said body, clamp means carried by said brackets and engageable with said tire structure for clamping said body thereon, and means associated with said clamp means for locking said latter means in its clamping position to prevent unauthorized removal of said cover from the tire and also the tire structure from said tire carrier.

9. The combination with a tire carrier, a spare tire structure, and devices associated with said tire carrier for clamping said spare tire structure thereto, of a cover for said spare tire comprising a body portion having an annular plane portion adapted to cover the face of the tire and a rearwardly curved portion adapted to cover the tread of the tire, said annular portion having a flange adapted to interlock with said tire carrier and to render said tire carrier clamp devices inaccessible, means carried by said body portion for clamping the latter upon said tire, and locking means associated with said cover clamping means for preventing manipulation of the same to remove said cover and said tire structure except by an authorized person.

10. The combination with a tire carrier, a spare tire structure, and devices associated with said tire carrier for clamping said spare tire structure thereto, of a cover for said spare tire comprising a body having an annular plane portion adapted to cover the face of the tire and a rearwardly curved portion adapted to cover the tread of the tire, said annular portion having a flange adapted to interlock with said tire carrier and to render said tire carrier clamp devices inaccessible, brackets on said body, clamp studs non-rotatably carried by said brackets, clamp jaws slidable upon said studs between rotatable and non-rotatable positions and associated with said tire structure to hold said cover in position thereon, and locks carried by said clamp jaws and engageable with said studs for preventing unauthorized manipulation of said jaws to remove the cover from the tire and the tire structure from the tire carrier.

11. In a tire cover having a sheet metal body with a side-wall-protecting portion having an angularly extending flange for protecting the tread portion of the tire, a hollow metal bracket having side flanges attached to said body flange, a stud member passing non-rotatably through said bracket, and a clamp member slidably carried by said stud member and engageable with the tire for holding the cover in position.

12. In a tire cover, a covering body taking the general shape of the tire and having a part adapted to be positioned above the tread portion of the tire, a bracket carried by said body, a stud carried by said bracket, a clamp member rotatable with respect to a portion of said stud and non-rotatable with respect to another portion of said stud and slidable along said stud toward and from said rotatable position to clamp and release the tire, and means acting on said clamp member to hold it in its several positions.

13. In a tire cover, a metal body having one part adapted to be associated with the face of the tire and another part adapted to be associated with the tread surface of the tire, a bracket carried by said body and having a rectangular opening therein, a rectangular stud mounted in said opening, said stud also having a circular portion, a clamp device mounted upon said stud so associated therewith that it may be movable to and from the rectangular and circular portions of the stud whereby in one position said clamp device is rotatable with respect to the stud and in another position it is non-rotatable.

14. The combination with a tire carrier, a spare tire structure and clamp means associated with said carrier and structure for fastening the same together, of a cover for said tire, said cover having a body formed to fit upon an exposed part of the tire, said body having a tire-face covering portion of such width as to extend over and render said tire carrier clamp means inaccessible, clamp devices carried by said body and including jaws formed to extend over and grip the tire structure, and lock means associated with said jaws for locking said body in its tire covering position so as to prevent removal of the tire structure from the tire carrier except by an authorized person.

15. The combination with a tire carrier, a spare tire structure, and devices associated with said tire carrier for clamping the spare tire structure thereto, of a cover for the spare tire, said cover comprising a body having a part covering a face of the tire and of such width as to extend over and render said tire carrier clamping devices inaccessible; clamp means carried by said body and engageable with the tire structure for clamping the body thereon, and means associated with said clamp means for locking the clamp means in clamping position to prevent unauthorized removal of said cover from the tire and of the tire structure from the tire carrier.

FREDERICK C. BURNETT.